US008778273B2

(12) United States Patent
Merbahi et al.

(10) Patent No.: US 8,778,273 B2
(45) Date of Patent: Jul. 15, 2014

(54) DEVICE FOR EMITTING A PLASMA JET FROM THE ATMOSPHERIC AIR AT AMBIENT TEMPERATURE AND PRESSURE, AND USE OF SAID DEVICE

(75) Inventors: Nofel Merbahi, Toulouse (FR); Mohammed Yousfi, Saint Orens de Gameville (FR); Olivier Eichwald, Lauzerville (FR)

(73) Assignees: Universite Paul Sabatier Toulouse III, Toulouse (FR); Centre National de la Recherche Scientifique, Paris (FR)

( * ) Notice: Subject to any disclaimer, the term of this patent is extended or adjusted under 35 U.S.C. 154(b) by 194 days.

(21) Appl. No.: 13/381,405

(22) PCT Filed: Jun. 23, 2010

(86) PCT No.: PCT/FR2010/051285
§ 371 (c)(1),
(2), (4) Date: Feb. 27, 2012

(87) PCT Pub. No.: WO2011/001070
PCT Pub. Date: Jan. 6, 2011

(65) Prior Publication Data

US 2012/0141321 A1 Jun. 7, 2012

(30) Foreign Application Priority Data

Jun. 29, 2009 (FR) ..................................... 09 03156

(51) Int. Cl.
*B01J 19/08* (2006.01)

(52) U.S. Cl.
USPC ..................................................... 422/186.04

(58) Field of Classification Search
USPC ..................................................... 422/186.04
See application file for complete search history.

(56) References Cited

U.S. PATENT DOCUMENTS

| | | | | |
|---|---|---|---|---|
| 5,198,724 | A | 3/1993 | Koinuma et al. | |
| 5,693,241 | A | 12/1997 | Banks et al. | |
| 7,229,589 | B2 | 6/2007 | Petcu et al. | |
| 2009/0188626 | A1 * | 7/2009 | Lu et al. | 156/345.35 |

FOREIGN PATENT DOCUMENTS

| | | |
|---|---|---|
| WO | 2004/073362 | 8/2004 |
| WO | 2007/006518 | 1/2007 |

OTHER PUBLICATIONS

International Search Report dated Oct. 26, 2010, corresponding to PCT/FR2010/051285.

* cited by examiner

*Primary Examiner* — Kishor Mayekar
(74) *Attorney, Agent, or Firm* — Young & Thompson

(57) ABSTRACT

Device for emitting a plasma jet at ambient pressure and temperature, includes an electric-field generator for generating discharges between an anode assembly and a cathode assembly. The cathode assembly defines an inter-cathode dielectric space that extends inside the cathode assembly and is opposite at least one cathode surface of the cathode assembly, and has at least one cathode opening extending outside the inter-cathode space, the cathode opening being defined by at least one active edge of the cathode surface, the active edge(s) extending in a cathode opening plane. The anode assembly includes at least one pointed portion that is oriented toward the outside of the inter-cathode space and is laterally and deeply placed relative to the cathode opening. The pointed portion extends up to the cathode opening plane, for causing a plasma jet emission that is spontaneously sprayed in a predetermined direction toward the outside of the inter-cathode space.

21 Claims, 9 Drawing Sheets

Figure 1:
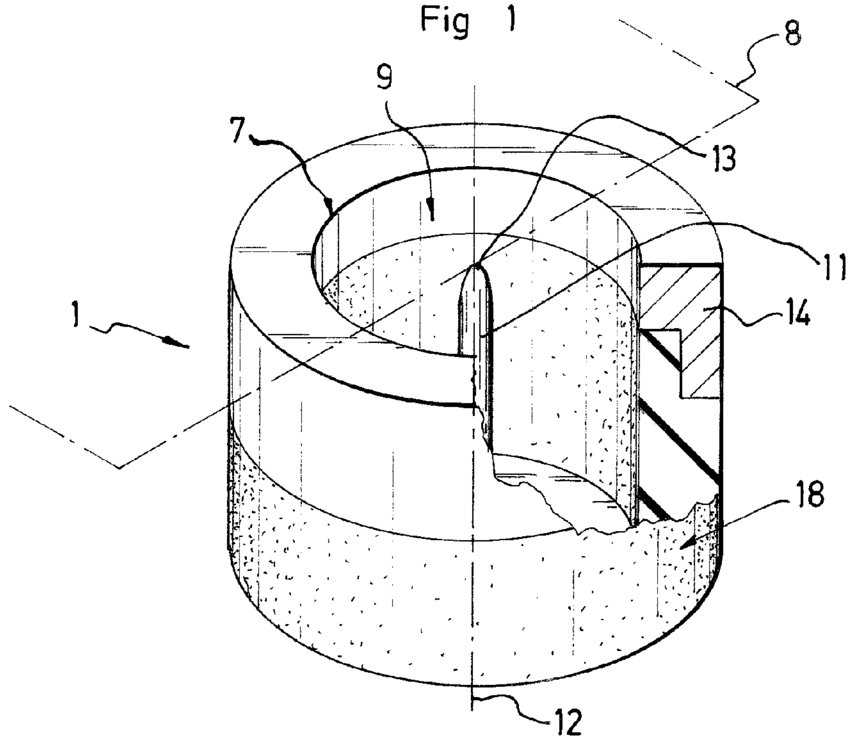

DEVICE FOR EMITTING A PLASMA JET FROM THE ATMOSPHERIC AIR AT AMBIENT TEMPERATURE AND PRESSURE, AND USE OF SAID DEVICE

FIELD OF THE INVENTION

The invention relates to a device for emitting a plasma jet from the atmospheric air at ambient pressure and temperature, the device being adapted to form a plasma jet which is self-projected, that is to say which does not require, for its projection, the addition of a specific means for generating a gas stream.

Such a device for emitting a plasma jet can be used especially in the nanotechnology field where treatment of surfaces with plasma is required, in the biomedical field for localised plasma treatments, especially for blood coagulation or for establishing and/or maintaining asepsis at the site of a surgical operation, and/or in the field of the treatment of surfaces with a view to their depollution, their biological decontamination or their sterilization.

BACKGROUND OF THE INVENTION

There are already known various devices permitting the generation of a “cold” plasma (that is to say at ambient temperature and pressure) by dielectric barrier discharge (DBD) between two electrodes coated with an insulating material, between which a gas stream (for example of helium, argon or nitrogen) is made to flow.

In a first type of known solution (see, for example, Laroussi et al., (2005), Applied Physics Letters, 87, 986-987; “Room-temperature atmospheric pressure plasma plume for biomedical applications”), such a device comprises two electrodes which are subjected to a potential difference and through which there passes a stream of argon having a displacement speed estimated at 8 m/s. Such a solution presupposes the provision of means for storing argon under pressure and for introducing a stream of argon which flows between the two electrodes. In particular, such a solution presents practical problems associated with the use of a gas under pressure and does not permit the production of a self-projected atmospheric air plasma at ambient pressure and temperature.

A second type of known solution, similar to the preceding solution, consists in forming a plasma of the “corona plasma” type between two coaxial electrodes separated by a volume of insulating gas.

The document Pointu et al. (2005) (Pointu A. M., Ricard A., Dodet B., Odic E., Larbre J. and Petchu M. G., (2005), J. Phys. D Appl. Phys. 38, 1905-1909; “Production of active species in $N_2$—$O_2$ flowing post-discharges at atmospheric pressure for sterilization”) describes a process for sterilization by means of a cold plasma produced during the treatment of a preformed gas stream of nitrogen and oxygen with a 10 kHz pulsed corona discharge generated between two electrodes. Such a sterilization process requires external means for forming a gas stream. Nor does it permit the production of a self-projected plasma from the atmospheric air at atmospheric pressure.

U.S. Pat. No. 7,229,589 describes a decontamination process for a surface, in which a stream of molecular nitrogen previously stored under pressure is subjected to a pulsed discharge in order to treat the gas stream with discontinuous discharges. Such a decontamination process requires means for preparing molecular nitrogen of high purity and for pressurizing it prior to the decontamination treatment, and does not permit the generation of a self-projected plasma jet from atmospheric air at atmospheric pressure.

SUMMARY OF THE INVENTION

The invention aims to remedy the disadvantages mentioned above by proposing a device adapted to emit a cold plasma jet, especially by corona discharge, which does not require a specific additional member for establishing a gas stream between electrodes.

In particular, the invention aims to propose such a device which is adapted for use in atmospheric air and which does not require any means for placing the inter-electrode space under vacuum or under pressure.

The invention further aims to propose a device which is adapted to emit a cold plasma jet at a distance from the discharge (that is to say at close post-discharge) and which is therefore substantially free of excited ionic species and rich in radiative and/or metastable, especially radical, excited neutral species.

The invention aims in particular to propose such a device which is capable of forming a cold plasma jet from the atmospheric air at atmospheric temperature and pressure.

The invention also aims to achieve all those objectives at a lower cost by proposing a device for emitting a cold plasma jet which has a low cost price and is produced from means—especially electronic and electrical components—which are conventional and inexpensive.

The invention relates also to the use of a device according to the invention in the field of surface treatment.

The invention further aims to propose such a device which is adapted especially for surface treatment, and a process for the treatment of a surface to be treated in which a device according to the invention is used, the process being simple to carry out and having an efficiency that is at least comparable to that of known processes.

The invention aims more particularly to propose such a device and such a use, the implementation of which is without risk to the user.

The invention aims also to propose such a device and such a use for the treatment of a surface to be treated which have increased efficiency and are respectful of the environment.

The invention additionally aims to achieve those objectives while preserving employees' working practices. It aims in particular to propose such a device which is simple to use and the use of which involves only a small number of operations.

To that end, the invention relates to a device for emitting a plasma jet at ambient pressure and temperature, comprising an electric field generator capable of generating discharges between an anode assembly and a cathode assembly, in which:

- the cathode assembly is formed so as to define a dielectric space, called the inter-cathode space:
  - which extends inside the cathode assembly and opposite at least one cathode surface of said cathode assembly, and
  - which has at least one cathode opening which opens to the outside of the inter-cathode space,
  - said cathode opening is defined by at least one edge, called the active edge, of the cathode surface, said active edge(s) extending in a plane, called the cathode opening plane,
- the anode assembly comprises at least one portion, called the pointed portion, having a minimum radius of curvature, which is oriented towards the outside of the inter-cathode space and is disposed laterally and at depth relative to the cathode opening of the cathode assembly;

in which device the pointed portion of the anode assembly is disposed so as to extend to the cathode opening plane and so as to be capable of causing an emission of a plasma jet which is projected spontaneously according to a predetermined orientation towards the outside of the inter-cathode space.

The electric field generator is connected to the anode assembly and to the cathode assembly so as to produce an electric field capable of generating the plasma jet. To that end, the electric field must have a higher potential value in the region of the anode assembly and a lower potential value in the region of the cathode assembly. When those potential conditions are satisfied, the plasma jet is emitted.

It is, of course, possible to provide a variable, for example alternating or pulsed, electric field, and the emission of the jet will itself be intermittent at the frequency of variation of the electric field. Preferably, the electric field generator is adapted to apply potentials having predetermined constant values (continuous or pulsed) to the anode and cathode assemblies. In other words, the electric field is of invariable, especially non-alternating, polarity.

Throughout the text, the terms “anode” and “anode assembly” denote an electrode or an assembly of electrodes, respectively, positioned at the highest potential of the electric field generated by the (continuous or pulsed) electric field generator. The terms “cathode” and “cathode assembly” denote an electrode or an assembly of electrodes, respectively, positioned at the lowest potential of an electric field generated by the electric field generator, in particular corresponding to earth potential (normally ground potential).

Advantageously, the voltage generator is chosen from the group formed of continuous voltage generators and pulsed voltage generators, especially forming a pulsed field having a frequency of from 1 kHz to 100 kHz.

Advantageously, the voltage generator is adapted to deliver between the anode assembly and the cathode assembly a voltage of from 0.5 kV to 20 kV.

The inter-cathode space is a cavity which extends between cathode surface portions (walls) of an electrically conductive material of the cathode assembly. The inter-cathode space is inscribed inside the cathode assembly, said cathode assembly opening to the outside of the inter-cathode space through the cathode opening. The inter-cathode space is filled with material, for example with atmospheric air at atmospheric pressure and ambient temperature. However, it is also possible for the inter-cathode space to be occupied by any other dielectric gas or gaseous composition or by a solid dielectric.

It is, of course, possible, in a variant, for a device according to the invention to further comprise means for introducing a gaseous composition into the inter-cathode space of the cathode assembly. Such means are, however, not necessary for the formation and emission of the self-projected cold plasma jet. However, they can permit the production of a self-projected plasma jet containing excited species obtained from gaseous species other than those of the atmospheric air. Nevertheless, in this variant, the plasma jet produced is not provided solely by the introduction of said gaseous composition.

The pointed portion of the anode assembly is oriented towards the outside of the inter-cathode space so as to form a self-projected cold plasma jet in the space extending beyond the cathode opening, outside the inter-cathode space, opposite the anode assembly. The minimum radius of curvature of the pointed portion of the anode assembly is not oriented in the direction towards a cathode surface of the cathode assembly but in a direction not secant to a cathode surface, especially in a direction substantially perpendicular to a plane defined by the cathode opening of the cathode assembly.

The pointed portion of the anode assembly can be a simple point of rotationally symmetrical form, that is to say in the form of an actual point. The pointed portion of the anode assembly can also be non-rotationally symmetrical, with a minimum radius of curvature in cross-section in a single plane and a different curvature in any other plane. Throughout the text, it must be understood that the expression “pointed portion” also includes embodiments in which the pointed portion of the anode assembly is a simple edge, more or less long, straight or curved, which extends longitudinally at the surface of the anode assembly and has, in transverse cross-section, a minimum radius of curvature oriented towards the outside of the inter-cathode space.

The inventors have found, surprisingly, that the application of a high positive voltage to the anode assembly comprising a pointed portion having a minimum radius of curvature disposed as indicated above relative to the cathode opening not only permits the formation of a discharge by generation of activated species from the atmospheric air, at ambient pressure and temperature, but also, without using any specific external means for producing a gas stream in the inter-cathode space, allows the formation of a self-projected cold plasma jet oriented towards the outside of the inter-cathode space.

In a device according to the invention, the formation of a self-projected cold plasma jet oriented towards the outside of the inter-cathode space is produced in the presence of an anode assembly and of a cathode assembly which are adapted to form a discharge—especially a corona discharge—and opposite the pointed portion of the anode assembly (where the excited—and therefore substantially non-ionic—species are produced) towards the outside of the inter-cathode space and in a direction substantially perpendicular to the cathode opening plane.

In a device according to the invention, the formation of a self-projected cold plasma jet does not occur (as in the devices of the prior art) by formation of an electric arc—between an anode assembly and a cathode assembly—and in which the ionic species formed are attracted by the cathode assembly.

Advantageously, the self-projected cold plasma jet is produced from the pointed portion of the anode assembly and in a direction substantially parallel to the minimum radius of curvature of said pointed portion.

On supplying the anode assembly of a device according to the invention at high voltage, the inventors observed the formation of a luminous halo extending from the pointed portion of the anode assembly towards the outside of the inter-cathode space over a distance of the same order of magnitude as the distance separating the anode assembly from the cathode assembly of the device.

The inventors think that this luminous halo shows the formation of molecular species in excited radiative states, the de-energizing transition of which is accompanied by the emission of photons, said excited molecular species being projected towards the outside of the inter-cathode space. This self-projected jet of gaseous plasma material would result from the formation of a blast of ionic particles, constituted by a mixture of charged particles, set into motion and accelerated by the electric field formed between the anode assembly and the cathode assembly, part of which would transmit its linear momentum to neutral particles at the time of elastic collisions, and leading to the emission of a self-projected plasma jet from the atmospheric air, at ambient pressure and temperature.

The spontaneous production of this jet of plasma material, extending over a distance of several centimeters, beyond the luminous halo has been observed and measured by means of an anemometer.

Such a device makes it possible to form, starting from and in the immediate vicinity of the pointed portion of the anode assembly, an electric field leading to the formation of a plasma jet self-projected towards the outside of the inter-cathode space of the device, outside the inter-cathode space.

Advantageously, in a device according to the invention, the formation of a self-projected cold plasma jet oriented towards the outside of the inter-cathode space does not require the addition of a specific external member for producing a stream of a gaseous composition in the inter-cathode space.

Advantageously preferably and according to the invention, the pointed portion of the anode assembly is disposed so that it extends as far as the cathode opening plane, without extending beyond it (tangent to the cathode opening plane).

Advantageously and according to the invention, the cathode opening plane extends tangentially to the pointed portion of the anode assembly. Advantageously, the cathode opening plane extends tangentially to the pointed portion of the anode assembly and perpendicularly to the radius of curvature of said pointed portion. Accordingly, in a device according to the invention, the plasma jet is spontaneously projected towards the outside of the inter-cathode space from said pointed portion of the anode assembly in a direction substantially perpendicular to the cathode opening plane. The best results are in fact obtained in that position.

In such a device according to the invention, the plasma jet is projected spontaneously—that is to say without the use of a gas stream formed or flowing inside the inter-cathode space—towards the outside of the inter-cathode space and not in the direction towards a surface of the cathode assembly.

Advantageously and according to the invention, the voltage generator is capable of generating corona discharges between the anode assembly and the cathode assembly. Advantageously, the voltage generator is capable of generating corona discharges in the inter-cathode space extending inside the cathode assembly and comprising the pointed portion of the anode assembly. Advantageously, the voltage generator is capable of generating corona discharges in the inter-cathode space extending inside the cathode assembly and from the pointed portion of the anode assembly.

Such a device according to the invention is configured to permit the formation of corona discharges at positive polarity between the anode assembly and the cathode assembly by generation of activated species—especially non-ionic activated species—from the atmospheric air, at ambient pressure and temperature, leading to the formation of a plasma jet self-projected in a direction perpendicular to the cathode opening plane, outside the inter-cathode space opposite said pointed axial end portion, without using any external means for producing a gas stream. In particular, such a device is adapted to avoid the formation of an electric arc producing species which are ionized and dissociated at high temperature.

Advantageously and according to the invention, the cathode opening is defined by at least one edge, called the active edge, of the cathode surface, said active edge(s) extending in the cathode opening plane. The cathode opening plane is a virtual plane secant to the cathode assembly.

The anode assembly and the cathode assembly are adapted to leave free a half-space delimited by the cathode opening plane beyond the inter-cathode space. However, it is possible, in a variant, for the anode assembly (and the pointed portion) to extend partially over a certain distance outside the inter-cathode space beyond the cathode opening plane or, on the other hand, inside the inter-cathode space. The cold plasma jet is self-projected from the pointed portion of the anode assembly into the space extending opposite said pointed portion of the anode assembly.

Advantageously, the self-projected cold plasma jet is produced from the pointed portion of the anode assembly and in a direction substantially parallel to the minimum radius of curvature of said pointed portion. Furthermore, the self-projected cold plasma jet is produced from the pointed portion of the anode assembly in a direction substantially orthogonal to the active edges of the cathode assembly.

Advantageously and according to the invention, the anode assembly comprises at least one cylindrical anode generated by revolution about an axial direction (in needle form), and the pointed portion is a pointed axial end portion of said cylindrical anode, said axial end portion having a cross-section, in at least one axial plane containing said axial direction, having a minimum radius of curvature, the value of which is adapted to permit the formation of discharges from the pointed axial end portion under the effect of an electric field formed by the generator(s).

Advantageously and according to the invention, the active edge is an edge of a cathode of the cathode assembly, said edge surrounding the axial end portion of the cylindrical anode of the anode assembly with which that cathode is associated.

Advantageously and according to the invention, the active edge(s) of the cathode(s) have at least one plane of symmetry perpendicular to the cathode opening plane of said cathode(s), said cathode opening plane comprising the axial end portion of each cylindrical anode with which the cathode(s) is(are) associated, and adapted to spontaneously orient the cold plasma jet perpendicularly to the cathode opening plane.

According to a variant of a device according to the invention, the cathode (or cathodes) have active edges disposed so as to occupy the vertices of an isosceles triangle—in particular an equilateral triangle—and the pointed axial end portion of the cylindrical anode is disposed so as to occupy the center of gravity of said triangle.

Advantageously and according to the invention, the active edge(s) of the cathode assembly has(have), in cross-section in at least one plane perpendicular to the cathode opening plane, said perpendicular plane comprising the pointed axial end portion of the cylindrical anode, a form symmetrical relative to said pointed axial end portion with which the cathode assembly is associated. Accordingly, in a device according to the invention, the cathode assembly comprises at least two active edge portions extending in the cathode opening plane symmetrically relative to the pointed axial end portion of the cylindrical anode and is adapted to spontaneously orient the cold plasma jet perpendicularly to the cathode opening plane.

Advantageously, in another embodiment according to the invention, the cathode assembly has an active edge having, in cross-section in each plane perpendicular to said cathode opening plane, a form having symmetry relative to said pointed axial end portion of each cylindrical anode with which the cathode assembly is associated. The active edge of the cathode assembly is a continuous active edge which extends in the cathode opening plane and is of central symmetry relative to the pointed axial end portion of the cylindrical anode of the anode assembly.

Advantageously and according to the invention, the active edge of the cathode assembly has a circular form or a polygonal form with a center of symmetry—especially hexagonal, octagonal, as a parallelogram, preferably as a square.

Such a device makes it possible to form a corona discharge at positive polarity between the anode assembly and the cathode assembly by generation of activated species from the atmospheric air, at ambient pressure and temperature, leading to the formation of a plasma jet self-projected in the direction perpendicular to the cathode opening plane, outside the inter-cathode space opposite said pointed axial end portion, without using any external means for producing gas streams.

Advantageously, according to another embodiment according to the invention, the cathode assembly comprises two cathode plates each having a straight active edge, said straight active edges of the two cathode plates being coplanar, mutually parallel and symmetrical to one another relative to a mid-plane comprising the pointed portion of the anode assembly. The anode assembly can be formed of a plurality of cylindrical anodes, the pointed axial end portion of minimum radius of curvature of each cylindrical anode extending in said mid-plane and in the cathode opening plane.

Advantageously and according to the invention, the minimum radius of curvature of the pointed portion of the anode assembly is less than 500 μm, especially from 1 μm to 500 μm, in particular from 10 μm to 100 μm. Preferably, the minimum radius of curvature of the pointed portion of the anode assembly is of the order of 20 μm.

Advantageously and according to the invention, the pointed portion of the anode assembly is formed of a conductive material selected from the group formed of tungsten, tungsten carbides, aluminium and their alloys.

Advantageously and according to the invention, the cathode opening plane of the cathode assembly is substantially perpendicular to the axial direction of the cylindrical anode. The plasma jet is self-projected from the pointed axial end portion of the cylindrical anode in a direction perpendicular to the cathode opening plane, and parallel to the axial direction of the cylindrical anode.

However, it is also possible in another embodiment for the cathode opening plane of the cathode assembly to be inclined relative to the axial direction of the cylindrical anode. In this variant of a device according to the invention, the plasma jet is self-projected from the axial end portion of the cylindrical anode in a direction perpendicular to the cathode opening plane, said direction not being parallel to the axial direction of the cylindrical anode.

Advantageously and according to the invention, the active edge(s) of the cathode assembly is(are) formed of at least one conductive material selected from the group formed of brass, copper and their alloys.

Advantageously and according to the invention, each cylindrical anode has, in transverse cross-section perpendicular to its axial direction, a substantially discoid form, the diameter of which is from 0.5 mm to 3 mm, especially of the order of 1 mm. A device according to the invention therefore comprises at least one cylindrical anode, each cylindrical anode having a pointed form, the point of which is oriented substantially according to the longitudinal axis of said cylindrical anode.

Advantageously, the pointed axial end portion of each cylindrical anode, having a minimum radius of curvature, extends substantially in the cathode opening plane of the cathode assembly. Advantageously, each cylindrical anode of the anode assembly and each cathode of the cathode assembly are adapted to cooperate and generate corona discharges between the axial end portion of minimum radius of curvature of each cylindrical anode and the cathode assembly with which those cylindrical anodes are associated.

Advantageously, a device according to the invention is adapted to produce a plasma jet at ambient pressure and temperature at a speed (speed of the gas stream of the plasma jet measured by means of an anemometer) of the order of from 1 m/s to 10 m/s.

Advantageously, a device according to the invention is of a suitable size that it can be held, carried and handled by a single user.

Advantageously, in a preferred embodiment, a device according to the invention comprises a cathode assembly and an anode assembly formed of a single cathode and a single anode, said cathode and said anode being in one or more pieces, the active edge(s) of the cathode surrounding the axial end portion of the single anode.

The invention relates also to the use of such a device for a surface treatment—especially for the microbiological decontamination of said surface—in which said surface is disposed in the self-projected plasma jet.

The inventors have indeed found that exposing *Escherichia coli* bacteria adherent on a solid surface to a cold plasma jet generated by a device according to the invention positioned several millimeters from said solid surface results in a reduction in the bacterial flora, especially division by a factor of 1000 of the initial bacterial population after 10 minutes' treatment, without it being necessary to use specific means known per se for the formation of a gas stream directed outside the inter-cathode space.

Accordingly, advantageously and according to the invention, a device for emitting a self-projected cold plasma according to the invention is used for the decontamination of surfaces, especially for the biostatic treatment and/or biocidal treatment of those surfaces.

Advantageously, a device according to the invention is used for the treatment of a surface in which the surface to be treated is not interposed between the electrodes of the plasma generator but is exposed, outside the device, to the self-projected cold plasma jet emitted by the device according to the invention.

Advantageously and according to the invention, a device for emitting a self-projected plasma jet according to the invention is used for blood coagulation and asepsis.

Advantageously and according to the invention, a device for emitting a self-projected plasma jet according to the invention is used for carrying out an operation of blood coagulation, or for establishing and/or maintaining asepsis.

The invention relates also to a device, to the use of such a device and to a process which are characterized in combination by all or some of the features mentioned hereinabove or hereinbelow.

BRIEF DESCIPTION OF THE DRAWINGS

Figure 2:
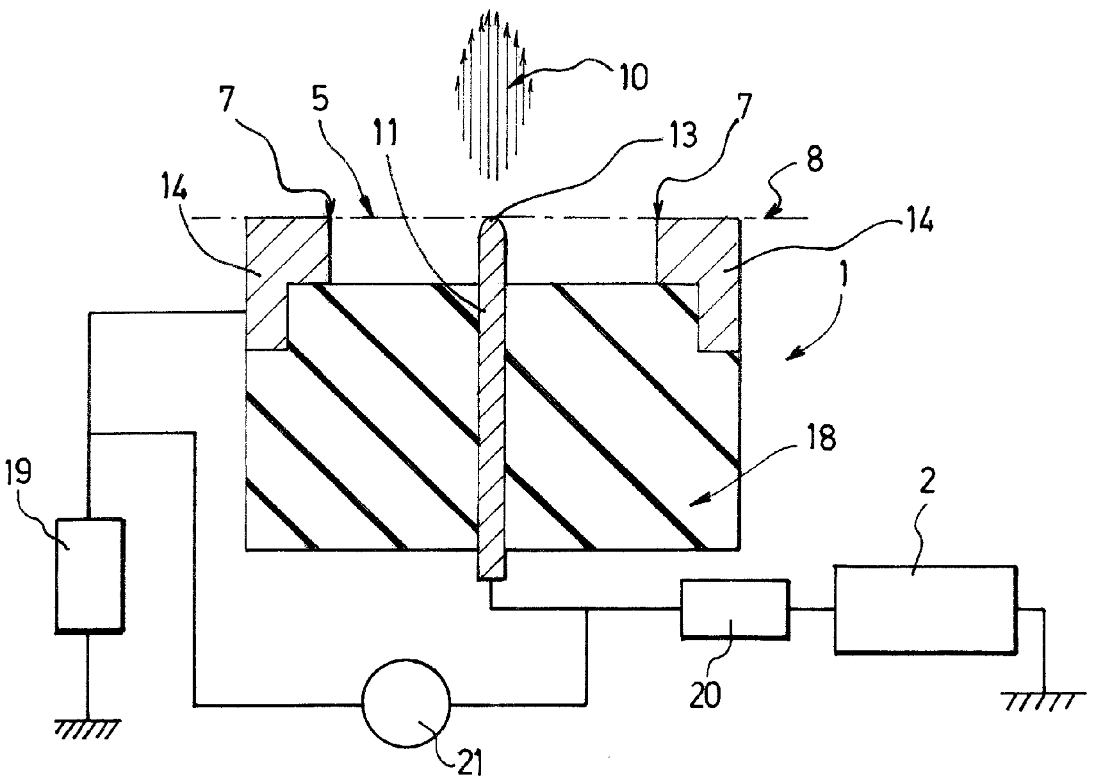
Figure 3:
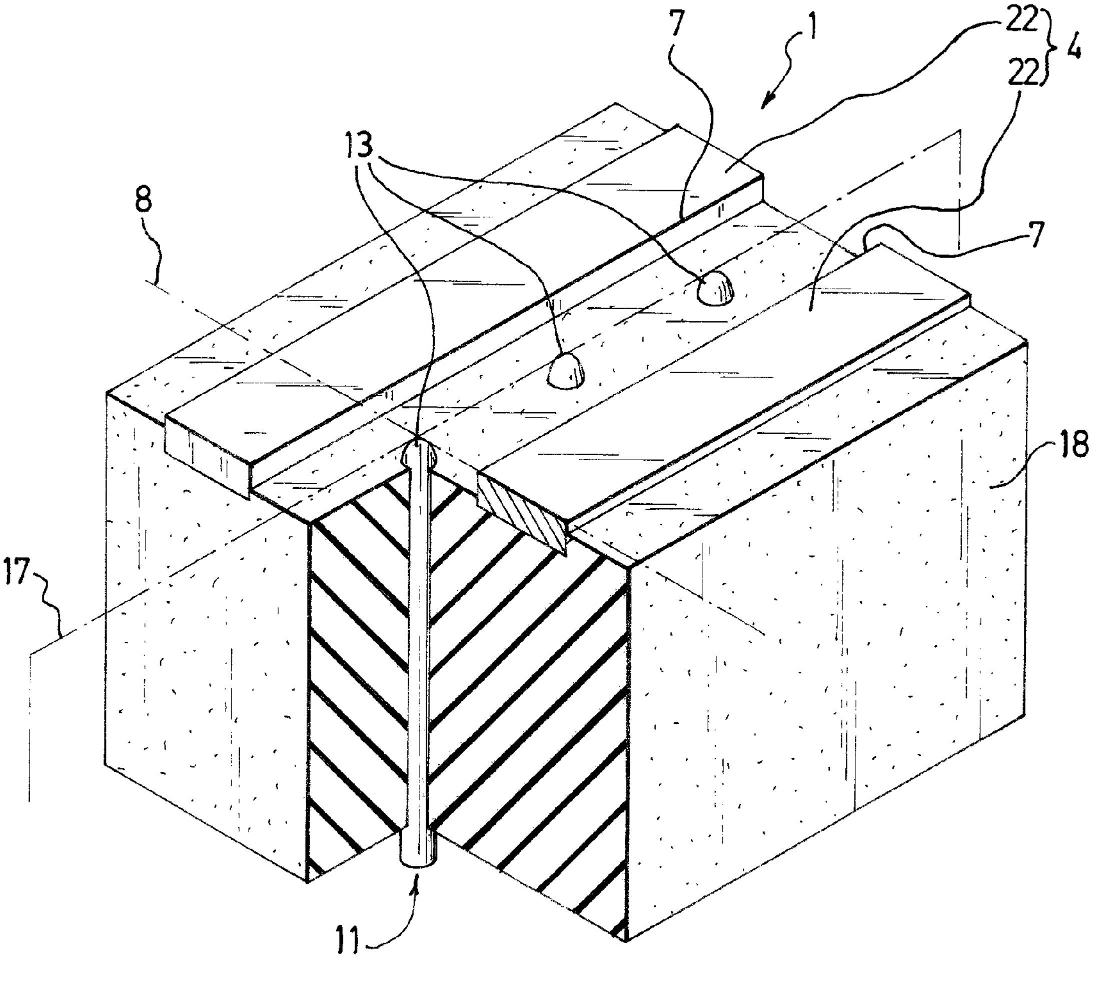
Figure 4:
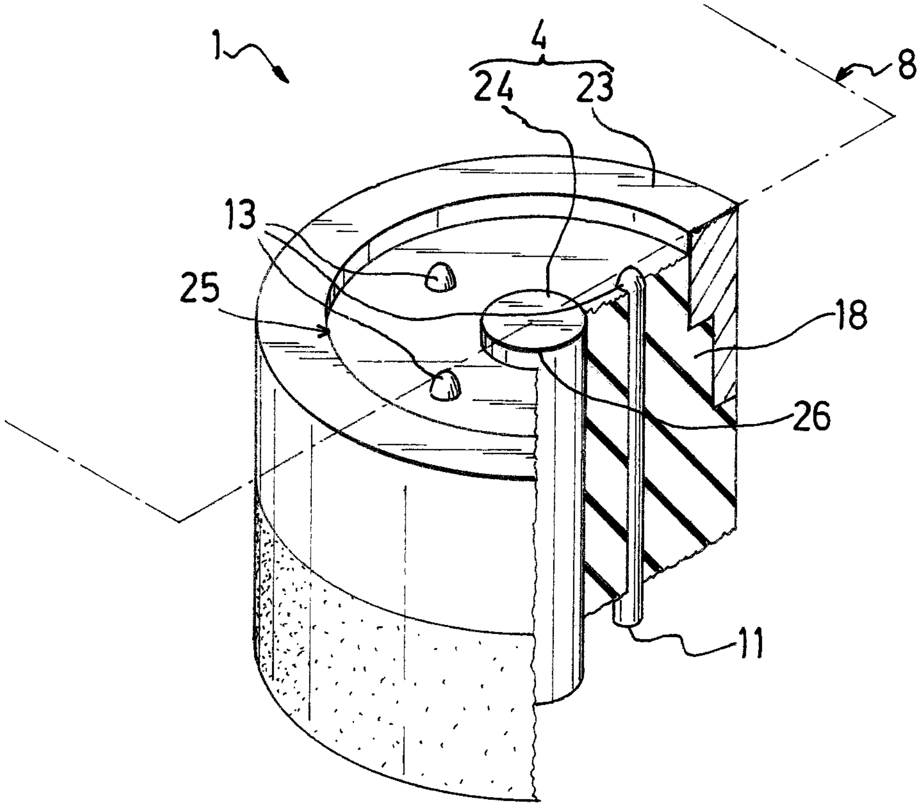
Figure 5A:
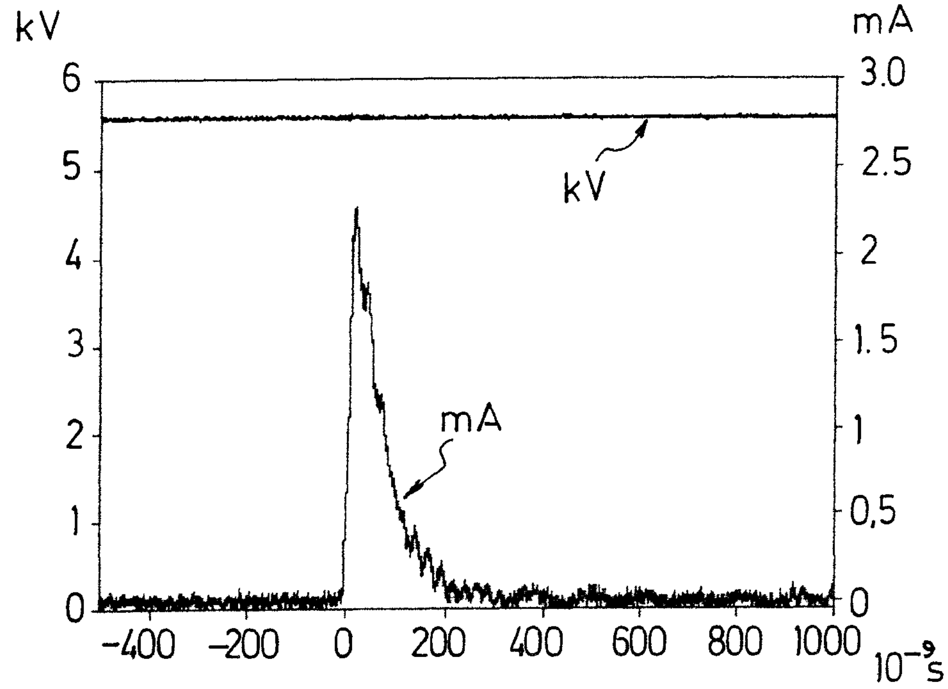
Figure 5B:
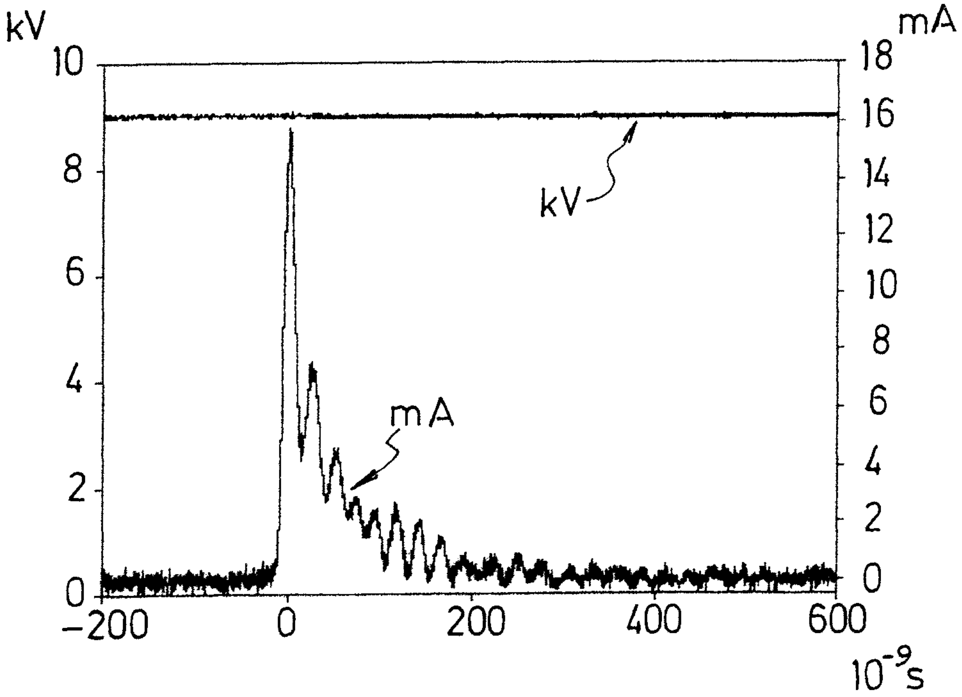
Figure 6A:
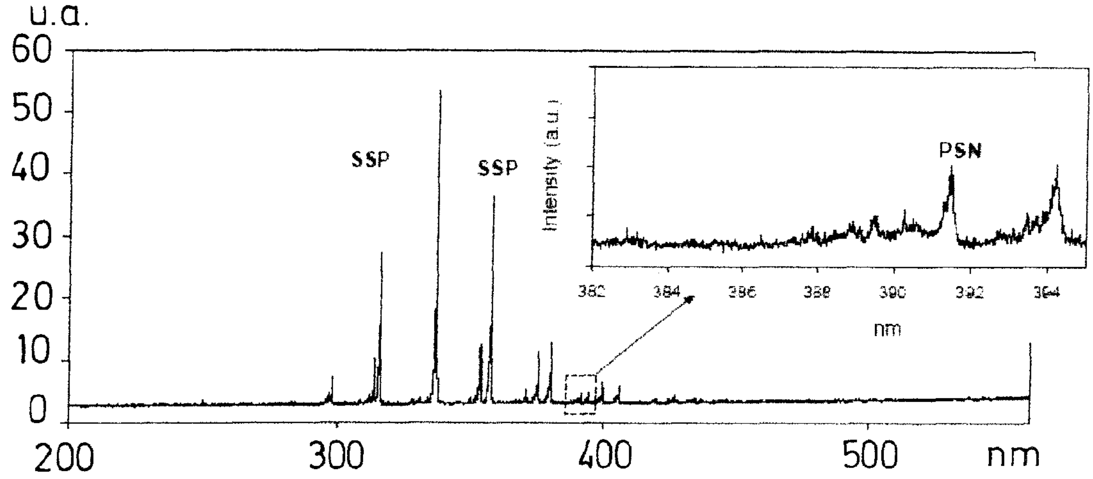
Figure 6B:
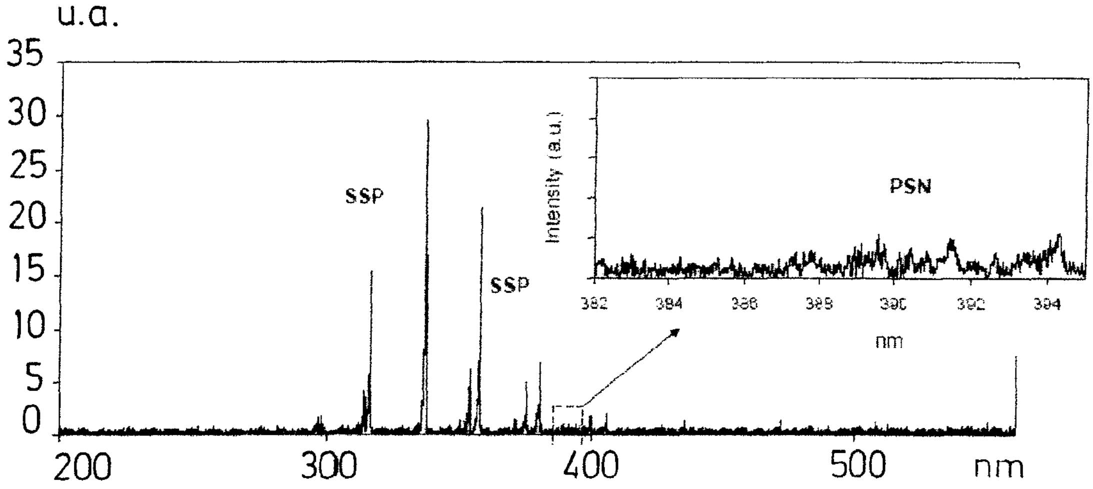
Figure 7:
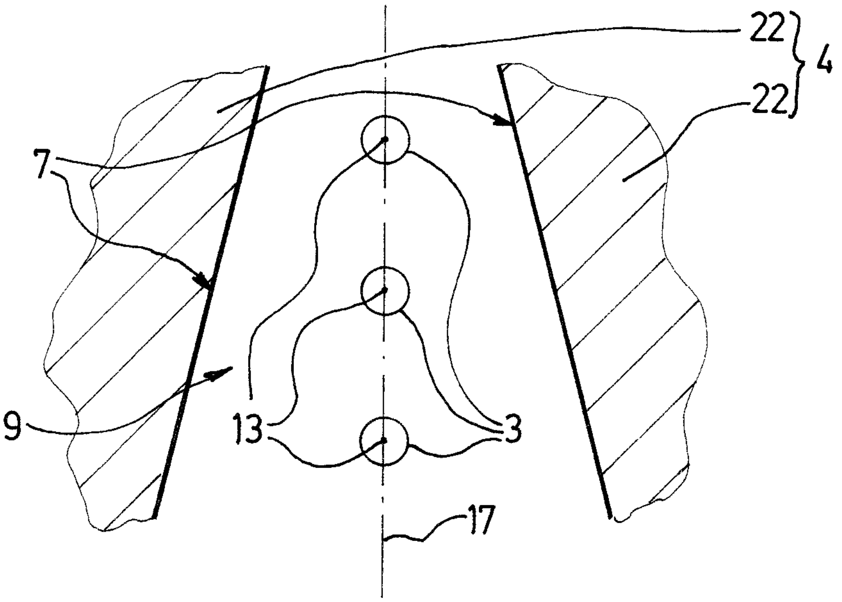
Figure 8:
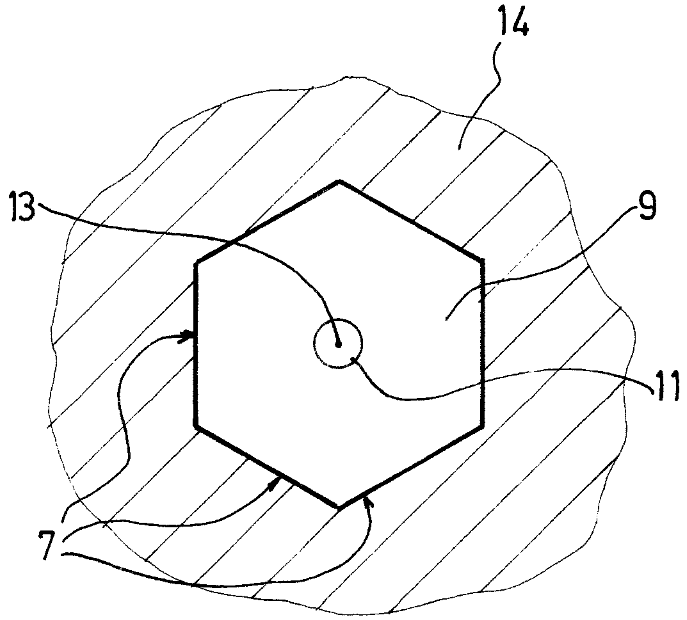
Figure 9:
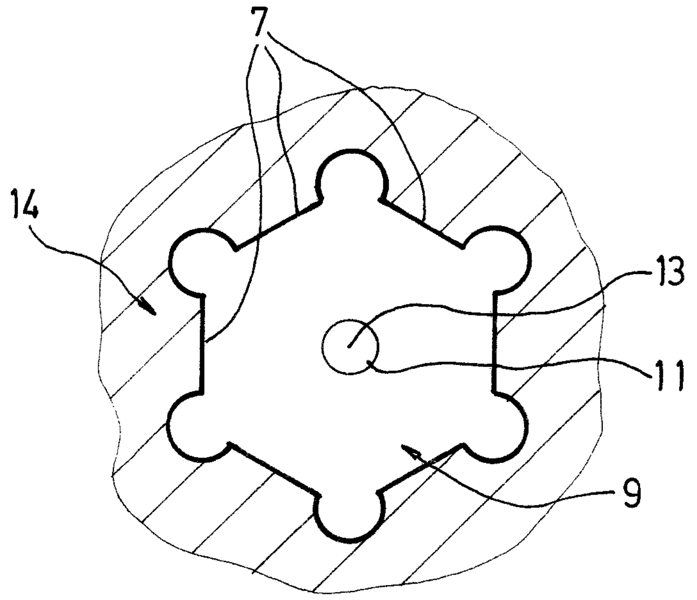
Figure 10:
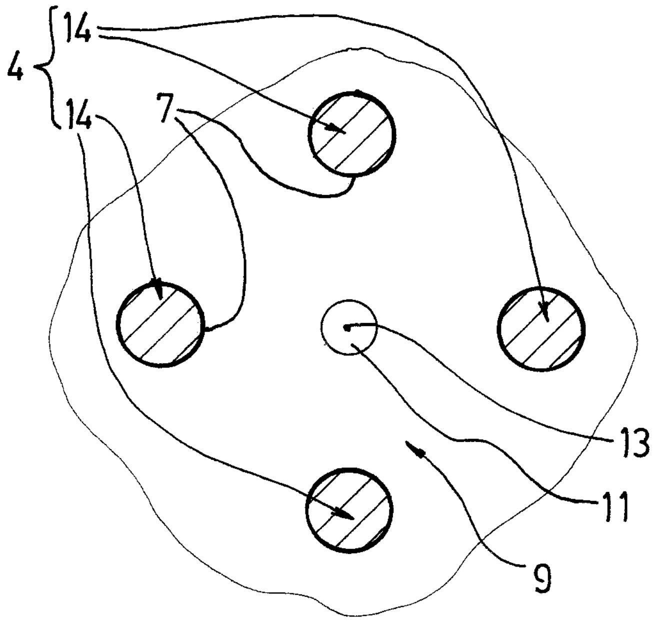
Figure 11:
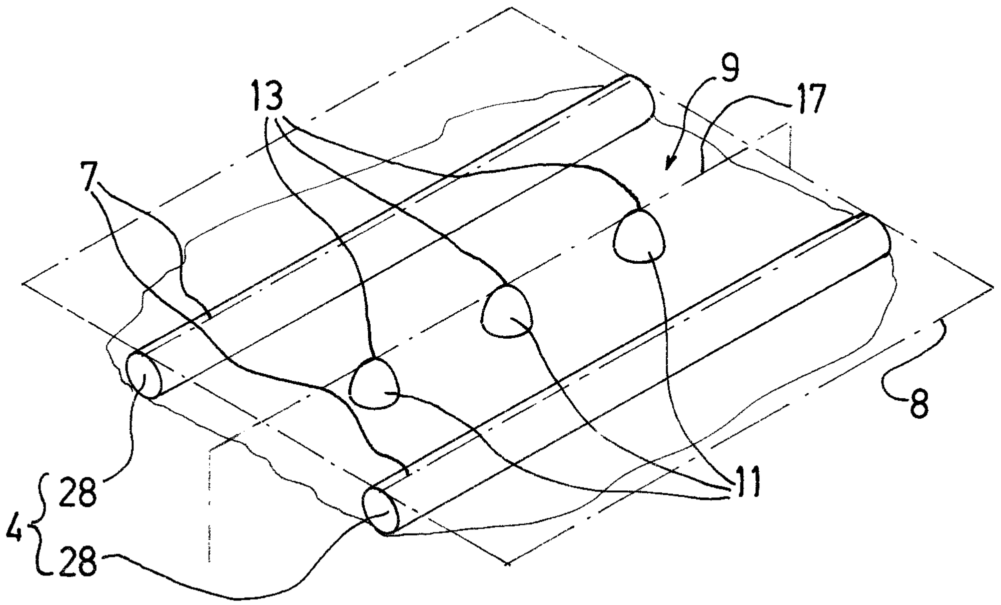
Figure 12:
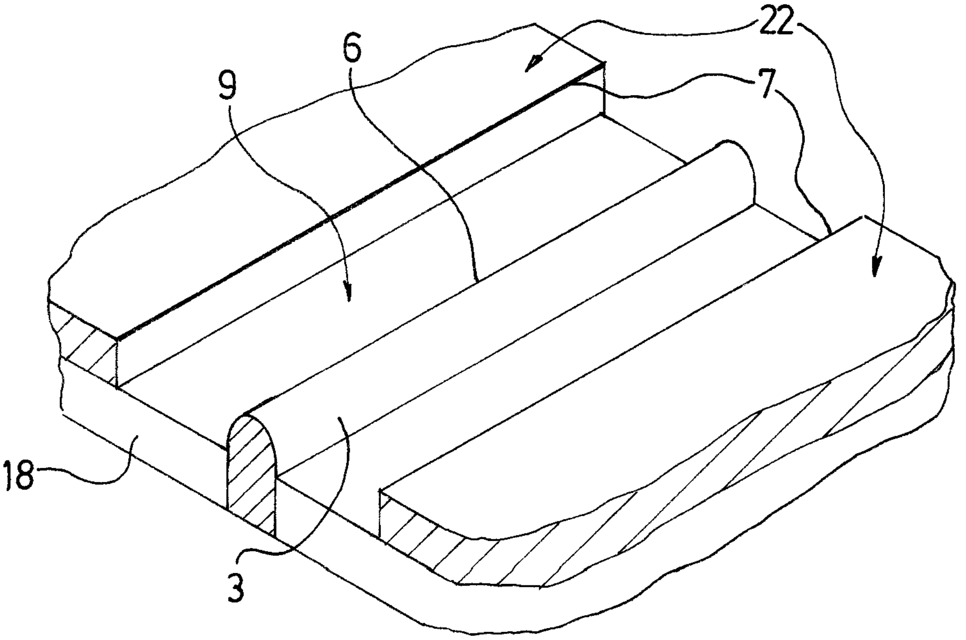
Figure 13:
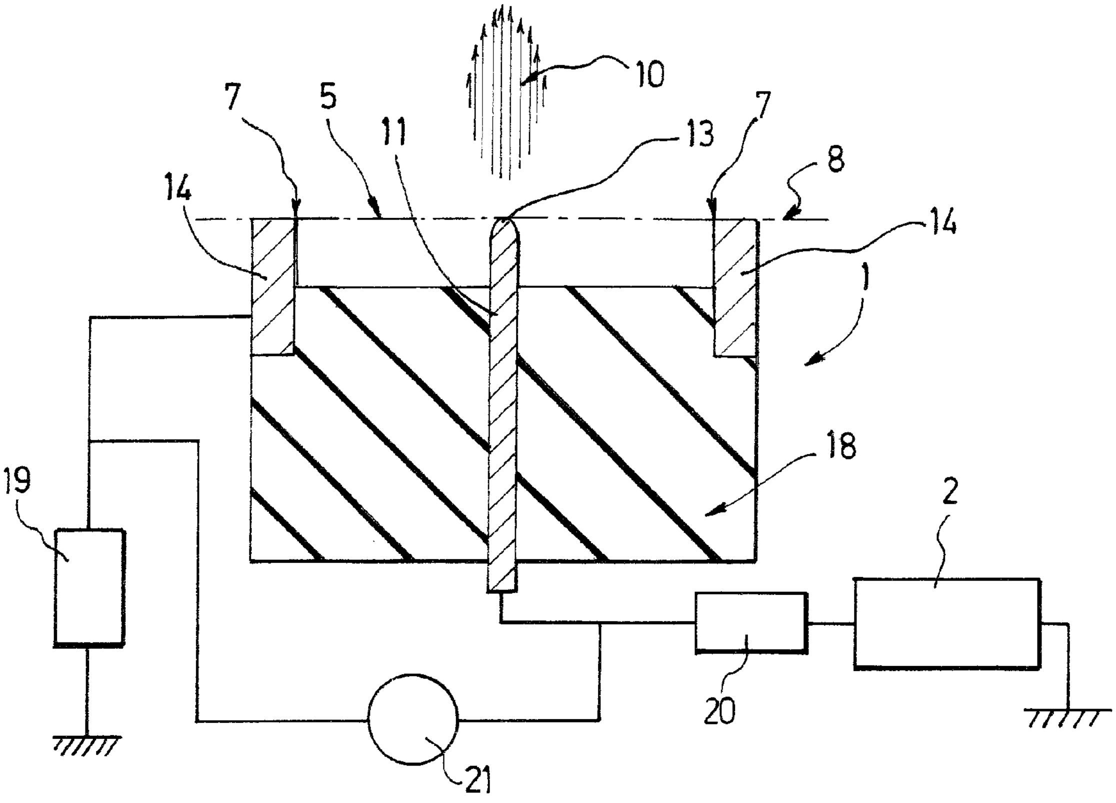

Other objects, features and advantages of the invention will become apparent upon reading the following description, which refers to the accompanying drawings showing preferred embodiments of the invention, given solely by way of non-limiting examples and in which:

FIG. 1 is a perspective view, partially cut away and out of proportion, of a device according to the invention, FIG. 2 is a schematic cutaway view of a device according to the invention, FIG. 3 is a view, partially cutaway and out of proportion, of a first variant of a device according to the invention, FIG. 4 is a perspective view, partially cutaway, of a second variant of a device according to the invention, FIG. 5*a* is a chart of the kinetic evolution of the electric intensity of a corona discharge obtained in a device according to the invention under a voltage of 5.6 kV, FIG. 5*b* is a chart of the kinetic evolution of the electric intensity of a corona discharge obtained in a device according to the invention under a voltage of 9.1 kV, FIG. 6*a* is a spectral imprint of a corona discharge obtained in a device according to the invention, FIG. 6*b* is a spectral imprint of the self-projected plasma jet obtained in a device according to the invention, FIG. 7 shows schematically a third variant of a device according to the invention, FIG. 8 shows schematically a fourth variant of a device according to the invention, FIG. 9 shows schematically a fifth variant of a device according to the invention, FIG. 10 shows schematically a sixth variant of a device according to the invention, FIG. 11 shows schematically a seventh variant of a device according to the invention, FIG. 12 shows schematically an eighth variant of a device according to the invention, FIG. 13 shows a variant of a device according to the invention as shown in FIG. 2.

DETAILING DESCRITION OF THE INVENTION

A device 1 for emitting a self-projected plasma jet at ambient pressure and temperature according to the invention shown in FIG. 1 comprises a conductive cathode 14 formed of a tube section of cylindrical cross-section generated by revolution, supported by an element 18 made of an electrically insulating material. The cathode 14 is formed of a conductive material, especially a conductive metal selected from the group formed of copper, brass or a conductive alloy comprising those metals. The cathode 14 has an continuous active edge 7 formed by the radial inner edge of the tube section, extending in the cathode opening plane 8 of the cathode 14 and opposite a pointed axial end portion 13 of a cylindrical anode 11. The pointed axial end portion 13 of the cylindrical anode 11 further forms a center of symmetry of the continuous active edge 7 of said cathode 14 opposite the pointed axial end portion 13 of the cylindrical anode 11 and extends in the cathode opening plane 8 of the cathode 14. The tube section forming the cathode 14 has an inside diameter of from 5 mm to 20 mm. In particular, the tube section can have an inside diameter of 5 mm, 10 mm, 13 mm, 14 mm or 20 mm. In those conditions, the distance separating the pointed axial end portion 13 of the cylindrical anode 11 and the active edge 7 of the cathode 14 is 2.5 mm, 5 mm, 6.5 mm, 7 mm or 10 mm, respectively. Solely by way of information, the outside diameter of the tube section forming the cathode 14 is 30 mm. That value has no influence on the use of the device 1 according to the invention.

In this device 1 for emitting a self-projected plasma jet according to the invention, the cathode 14 has, in transverse cross-section, a center of symmetry, said center of symmetry belonging to the axis of elongation of the cylindrical anode 11 in its axial direction 12. However, it is possible that only the active edge 7 of the cathode 14 has a transverse cross-section allowing for a center of symmetry. Accordingly, the cathode 14 can have any form if the active edge 7 of said cathode 14, formed by the inner edge of the tube section forming the cathode 14, allows for a center of symmetry formed by the pointed axial end portion 13 of the cylindrical anode 11. Accordingly, the cathode 14 can have a transverse cross-section of circular form. The active edge 7 of the cathode 14 which is opposite the pointed axial end portion 13 of the cylindrical anode 11 is then, in transverse cross-section in the cathode opening plane 8, of circular form.

In a device 1 for emitting a self-projected plasma jet according to the invention, it is possible for the active edge 7 of the cathode 14 to have, in transverse cross-section in the cathode opening plane 8, a polygonal form having a center of symmetry, in particular a square form, a rectangular form, a hexagonal form, an octagonal form and a decagonal form. The continuous active edge 7 of the cathode has, in transverse cross-section in the cathode opening plane 8, a polygonal form having an even number of sides. It is also possible for the continuous active edge 7 of the cathode 14 to have, in transverse cross-section in the cathode opening plane 8, a polygonal form having an odd number of sides and allowing for at least one plane of symmetry perpendicular to the cathode opening plane 8, said plane of symmetry comprising the pointed axial end portion 13 of the cylindrical anode 11 with which that cathode 14 is associated.

In a device 1 for emitting a self-projected plasma jet shown in FIG. 1, the cylindrical anode 11 can be formed of a solid cylinder formed of an electrically conductive material. It is also possible for only an outer surface layer of the cylindrical anode 11 to be constituted by a conductive material connected to a high voltage generator, and in which the pointed axial end portion 13 of said cylindrical anode 11 has a minimum radius of curvature oriented substantially in the direction perpendicular to the cathode opening plane 8 defined by the active edge(s) 7 of the cathode 14 with which that cylindrical anode 11 is associated. Accordingly, it is possible for the pointed axial end portion 13 of said cylindrical anode 11 to have a minimum radius of curvature oriented substantially in the axial direction 12 of the cylindrical anode 11.

In a device 1 according to the invention, it is possible for a portion of a solid insulating material to cover the portion of the cathode 14 oriented towards the outside of the inter-cathode space and extending around the active edge 7 of said cathode 14, but without covering the pointed axial end portion 13 of the cylindrical anode 11.

In a device 1 for emitting a self-projected plasma jet 10 shown schematically in FIGS. 2 and 13, the conductive cathode 14 is connected to earth by way of a current-measuring resistor 19. In this particular embodiment according to the invention, the value of the measuring resistor 19, provided to measure the current, is 50 Ω. The device 1 for emitting a plasma jet 10 according to the invention further comprises a cylindrical anode 11 formed of a conductive cylinder, extending according to the axis of the hollow cylinder forming the cathode 14, connected electrically to a high voltage generator 2 by way of a resistor 20 of resistance 25 MΩ in order to limit the current in the case of the formation of an arc. The high voltage generator 2 can be a generator 2 adapted to distribute a continuous supply or a pulsed supply. The high voltage generator 2 is adapted to deliver in the cylindrical anode 11 a high voltage which can reach 15 kV.

In a device 1 for emitting a self-projected plasma jet 10 according to the invention, the distance separating the pointed axial end portion 13 of the cylindrical anode 11 and the active edge 7 of the cathode 14 opposite said pointed axial end portion 13 can vary depending on the structure of the device 1. However, in such a device 1 according to the invention, the obtainment of a corona discharge at positive polarity that generates a self-projected plasma jet 10 with electrodes that are more widely spaced requires the application of a high voltage having a higher value to the cylindrical anode 11 or a high potential difference between the cylindrical anode 11 and the cathode 14.

Furthermore, in a device 1 for emitting a self-projected plasma jet 10 according to the invention, it is possible to connect electrically, between the cylindrical anode 11 and the cathode 14, a member 20 for measuring the voltage and/or the intensity of the electric current at the terminals of the cathode 14 and of the cylindrical anode 11, especially an oscilloscope 20.

The cylindrical anode 11 and the cathode 14 are held in a stable position by means of an element 18 of an electrically insulating material selected from the group formed of glass, quartz, alumina, a polymer and ceramics, with which they are integral. The pointed axial end portion 13 of the cylindrical anode 11 preferably extends in the cathode opening plane 8 defined by the cathode opening 5 of the cathode 14. It is also possible for the pointed axial end portion 13 of minimum radius of curvature of the cylindrical anode 11 to extend axially outside the cathode opening plane 8 of the cathode 14, in particular at a distance of several millimeters, especially from 1 to 2 millimeters, beyond or short of the cathode opening plane 8 of the cathode 14.

In a device 1 according to the invention, it is sufficient for the element 18 of electrically insulating material to form a free space between the axial end portion 13 of minimum radius of curvature of the cylindrical anode 11 and the active edge 7 of the cathode 14.

In a device 1 according to the invention shown in FIG. 13, the conductive cathode 14 has, in cross-section in each axial plane of said cathode 14, a section of square cross-section. Accordingly, in a device according to the invention, the cathode 14 of the cathode assembly does not form an edge of the inter-cathode space 9. The corona discharges are then produced directly between the active edge 7 of the cathode 14 and the axial end portion 13 of the cylindrical anode 11 and result in the formation of a plasma jet from said axial end portion 13 in a direction perpendicular to the cathode opening plane 8 and parallel to the axial direction of the cylindrical anode 11.

In a first variant shown in FIG. 3, a device 1 for emitting a plasma jet 10 comprises a cathode assembly 4 formed of two lamellar cathode plates 22 supported by an element 18 formed of an electrically insulating material. The two lamellar cathode plates 22 each have an active edge 7 of said cathode assembly 4, the two active edges 7 of the cathode plates 22 being mutually parallel and define the cathode opening plane 8. Such a device further comprises a plurality of cylindrical anodes 11 each having a pointed axial end portion 13 of minimum radius of curvature, extending opposite the two active edges 7 of the cathode assembly 4 and forming the anode assembly 3. The axial end portions 13 of the cylindrical anodes 11 extend in the mid-plane defined by the two parallel active edges 7 of the two cathode plates 22 and in the cathode opening plane 8 of the cathode assembly 4. On production of a corona discharge at positive polarity by operation of a device 1 according to the first variant according to the invention, the inventors observed the formation of a plasma jet 10 in the form of a curtain extending from the axial end portions 13 of the cylindrical anodes 11 in the mid-plane of the two parallel active edges 7 of the two cathode plates 22 of the cathode assembly. In this variant of a device according to the invention, the voltage applied to each of the cylindrical anodes 11 of the plurality of cylindrical anodes 11 is substantially the same.

Advantageously, the two cathode plates 22 are coplanar, and the axial end portions 13 of the cylindrical anodes 11 of the anode assembly 3 extend in the mid-plane defined by the two active edges 7 of the cathode plates 22 forming the cathode 14. In particular, the two planar cathode plates 22, supported on an element 18 of an electrically insulating material and forming the cathode 14, are of substantially rectangular form, and the active edges 7 of each rectangular cathode plate 22 of the cathode 14 opposite the axial end portion(s) 13 of the cylindrical anodes 11 are substantially mutually parallel.

In a second variant shown in FIG. 4, a device 1 for emitting a plasma jet 10 comprises a cathode assembly 4 formed of a tubular outer cathode 23 and a cylindrical inner cathode 24, which are concentric. The tubular outer cathode 23 has an inner active edge 25 formed by the inner edge of the tube forming the tubular outer cathode 23 and extending in the cathode opening plane 8 of the cathode assembly 4 of the device 1. The cylindrical inner cathode 24 also has an outer active edge 26 formed by the edge defined by the planar longitudinal end of the cylinder of the cylindrical inner cathode 24 and extending in the cathode opening plane 8. The active edges 25, 26 of the tubular outer cathode 23 and of the cylindrical inner cathode 24 are formed of a metal or of a conductive metal alloy. A device 1 for emitting a plasma jet 10 shown in FIG. 4 further comprises an anode assembly 3 formed of a plurality of cylindrical anodes 11 each having, in their axial direction, a pointed axial end portion 13, the cross-section of which, in at least one axial plane, has a minimum radius of curvature adapted to permit the formation of a corona discharge at positive polarity. In particular, the pointed axial end portion 13 of each cylindrical anode 11 extends in the cathode opening plane 8 of the cathode assembly 4. Each cylindrical anode 11 of the anode assembly 3 is positioned so that the axial end portion 13 of each cylindrical anode 11, the inner active edge 25 of the outer cathode 23 and the outer active edge 26 of the inner cathode 24 are substantially aligned in the cathode opening plane 8 of the device 1, and in such a manner that the pointed axial end portion 13 of each cylindrical anode 11 is equidistant from the inner active edge 25 of the outer cathode 23 and from the outer active edge 26 of the inner cathode 24.

In a third variant shown schematically in FIG. 7, a device 1 according to the invention comprises a cathode assembly 4 formed of two cathode plates 22 each having a continuous straight active edge 7 in the form of a segment, said active segments 7 of the two cathode plates 22 forming the cathode assembly 4 being coplanar and non-parallel. Advantageously, the active segments 7 of the two cathode plates 22 form an acute angle between them and are symmetrical relative to the mid-plane 17 defined by the two active segments 7 of the two cathode plates 22, said mid-plane comprising the axial end portion(s) 13 of said cylindrical anode(s) 11 with which the cathode plates 22 of the cathode assembly 4 are associated. In this variant of a device according to the invention, the shortest distance separating the active segments 7 opposite the two cathode plates 22 is variable, and the distance separating each axial end portion 13 of each cylindrical anode 11 with which the cathode plates 22 are associated through the inter-cathode space 9 is also variable. Consequently, the voltage applied to each cylindrical anode 11 will be different: that applied voltage is smaller for the cylindrical anode 11 closest to the active segments 7 and higher for the cylindrical anode furthest away from the active segments 7.

In a fourth variant, shown schematically in FIG. 8, of a device 1 according to the invention, the active edge 7 of the cathode 14 is a continuous active edge 7 formed by a plurality of active edge segments 7 opposite the pointed axial end portion 13 of the cylindrical anode 11 with which the cathode 14 is associated. In this variant of a device 1 according to the invention, the active edge segments 7 form a regular hexagon, extend in the cathode opening plane 8 of the cathode 14 and are distributed in that cathode opening plane 8 in such a manner that the active edge segments 7, in pairs, allow for central symmetry relative to the pointed axial end portion 13 of the cylindrical anode 11 with which that cathode 14 is associated.

It is also possible, in a device 1 for emitting a self-projected plasma jet 10, for the active edge 7 of the cathode 14 to form the sides and/or vertices of a regular polyhedron extending in the cathode opening plane 8, in which the pointed axial end portion 13 of the anode assembly 3 also extends substantially in the cathode opening plane 8, and forms the center of the circle circumscribed round the regular polyhedron. In particular, the regular polyhedron can be an equilateral triangle, a square, a regular pentagon, a regular hexagon, a regular heptagon, a regular octagon or any other regular polyhedron having a higher number of sides and vertices.

In a fifth variant, shown schematically in FIG. 9, of a device according to the invention, the active edge 7 of the cathode 14 is formed of a plurality of discontinuous active segments extending in the cathode opening plane 8 of the cathode assembly 4. Furthermore, the active segments 7 are distributed in the cathode opening plane 8 of the cathode 14 in such a manner that the active segments 7, in pairs, allow for a central symmetry relative to the pointed axial end portion 13 of the cylindrical anode 11 with which that cathode 14 is associated. It is also possible for the distribution of the active segments 7 to allow for a center of symmetry formed by the pointed axial end portion 13 of the cylindrical anode 11 with which the cathode 14 is associated.

In a sixth variant, shown schematically in FIG. 10, of a device 1 according to the invention, the cathode assembly 4 is formed of a plurality of cathodes 14 connected to earth. Each cathode 14 has an active edge 7 extending in the cathode opening plane of the cathode assembly 4, said cathode opening plane comprising the pointed axial end portion 13 of a cylindrical anode 11.

In a seventh variant, shown schematically in FIG. 11, a device 1 according to the invention comprises a cathode assembly 4 formed of two coplanar conductive wires 28, the two coplanar conductive wires 28 each forming an active edge 7 of the cathode assembly 4, extending opposite the pointed axial end portion 13 of at least one cylindrical anode 11, the axial end portion(s) 13 of each cylindrical anode 11 extending in the cathode opening plane 8 formed by the active edges 7 of the coplanar conductive wires 28, and extending in the mid-plane 17 of said active edges 7 with which that anode assembly 3 is associated.

In an eighth variant, shown schematically in FIG. 12, a device 1 according to the invention comprises a cathode assembly 4 formed of two cathode plates 22 each having an active edge 7, the two active edges being coplanar and parallel to one another, and an anode assembly 3 extending longitudinally between the two cathode plates 22 and having a pointed portion 6 extending longitudinally in the mid-plane of the active edges 7 of the two cathode plates 22 and in the cathode opening plane 8 of the cathode assembly 4 towards the outside of the dielectric inter-cathode space.

In a variant (not shown) of a device 1 according to the invention, the cathode 14 can have the form of a disk of small thickness, especially having a thickness of several millimeters, which is hollowed in its center and supported by an element 18 of an electrically insulating material, said hollowed center of the cathode 14 forming a space occupied in part by the pointed axial end portion 13 of the cylindrical anode 11. In particular, in this configuration, the active edge 7 of the cathode 14 has, in cross-section in each radial plane, a symmetrical form relative to said pointed axial end portion 13 of the cylindrical anode 11, and the active edge 7 of the cathode 14, formed by the thickness of said disk hollowed at its center, is opposite the pointed axial end portion 13 of the cylindrical anode 11.

In another embodiment (not shown) according to the invention, a device comprises an anode assembly 3 formed of a plurality of anodes, the axial end portions 13 of which are coplanar, and a cathode assembly 4 formed of a plurality of cathodes 14 comprising coplanar active edges 7, the cathode opening plane 8 of the cathode assembly 4 comprising the axial end portions 13 of the anodes, said active edges 7 of the cathodes 14 being evenly distributed around the axial end portions 13 of the anodes and forming a planar network, especially a network of the hexagonal type, of the square type or of the triangular type.

EXAMPLE 1

Device for Emitting a Self-Blown Plasma Jet

A plasma device according to the invention is formed, in which the conductive anode is formed of a tungsten cylinder in which the diameter of the transverse cross-section is of the order of 1 mm. The minimum radius of curvature of the axial portion of the end of said anode is 20 μm. The cathode is formed of a hollow copper cylinder having a transverse cross-section, the inside diameter of which is 13 mm and the outside diameter of which is 30 mm. The cylindrical cathode is supported by a hollow insulating cylinder made of ceramics (alumina) having a thickness of 8 mm, which is itself adapted to hold the conductive anode in axial position. Such a device is produced so that the axial end of the anode is situated in the opening plane of the cathode.

In this configuration, the anode and the cathode are in contact with the atmospheric air at ambient temperature and pressure, that is to say at a temperature close to 22° C. There is applied to the anode an increasing voltage not exceeding 15 kV. The inventors observed, starting from a threshold voltage value of 2.6 kV, the formation of a non-repetitive corona discharge occupying a small volume immediately adjacent to the axial end of the anode. The maximum instantaneous current generated by that corona discharge and measured on the oscilloscope is 0.9 mA. That non-repetitive corona discharge was observed up to a voltage value of 5.3 kV. Beyond that threshold value of 5.3 kV, a repetitive corona discharge, with a repetition frequency of the order of several kHz, manifested itself by the appearance of a corona halo formed of a bluish-coloured plasma extending into the atmosphere along the longitudinal axis of the anode and over a distance of about 10 mm beyond the axial end of said anode, and having a diameter of the order of 3 mm.

The plasma jet is stable for a voltage between 5.3 kV and 9.1 kV and increases in luminous intensity proportionally to the increase in voltage. Beyond a voltage of 9.1 kV, sparks appear in the inter-electrode space between the anode and the cathode, corresponding to the formation of an electric discharge of the electric arc type, which is undesirable in this mode of operation.

The inventors noted, when a hand was passed through the free space opposite the axial end of the anode and at a distance greater than 10 cm from said axial end of the anode, the emission of a gas stream in the axial direction of the anode and oriented towards the outside of the inter-electrode space and the displacement speed of which, evaluated by means of a millimetric propeller anemometer, was from 1 m/s to 10 m/s.

The temperature of the plasma jet was evaluated at the distal end of the corona halo, that is to say approximately 10 mm from the axial end portion of the anode of minimum radius of curvature, at approximately 27° C., that is to say a temperature slightly above ambient temperature.

EXAMPLE 2

Characterization of the Instantaneous Current Generated by the Corona Discharge

The variation in the intensity of the electric current produced by the corona discharge is measured by means of an oscilloscope. The kinetic intensity profiles of the instantaneous electric current are given in FIGS. 5*a* and 5*b* for applied voltages of 5.6 kV (FIG. 5*a*) and 9.1 kV (FIG. 5*b*). The maximum intensity of the instantaneous electric current generated by the corona discharge is 2.4 mA for a supply voltage of 5.6 kV and 16 mA for a supply voltage of 9.1 kV. The natural repetition frequency of such a corona discharge under those conditions is approximately 20 kHz.

EXAMPLE 3

Spectral Characterization of the Self-Blown Plasma Jet

Analytical spectra, shown in FIGS. 6*a* and 6*b*, were produced in the visible wavelength range, directed on the one hand axially at the discharge zone surrounding the anode tip and on the other hand at the highest point of the plasma jet approximately 10 mm above the plasma jet. These spectra characterize the excited species present in the corona discharge (FIG. 6*a*) and in the plasma jet at the greatest distance from the anode (FIG. 6*b*). The spectral chart in FIG. 6*a* shows the presence of characteristic bands of radiative excited species, in particular nitrogen, especially the spectral transition bands of the second positive system (denoted SSP; $N_2(C^3\Pi_u, \upsilon) \rightarrow N_2(B^3\Pi_g, \upsilon')+h\nu$) and of the first negative system (denoted PSN; $N^+_2(B^2\Sigma^+_u, \upsilon) \rightarrow N^+_2(X^2\Sigma^+_g, \upsilon')+h\nu$). It is observed that the spectral band PSN relating to the de-energization of the ion $N^+_2(B^2\Sigma^+_u, \upsilon)$ is present in the spectrum of the corona discharge (FIG. 6*a* and framed in FIG. 6*a*), while it is absent in the spectrum of the plasma jet (FIG. 5*b* and framed in FIG. 5*b*).

EXAMPLE 4

Influence of the Minimum Radius of Curvature of the Axial End of the Anode on the Intensity of the Maximum Instantaneous Current Generated by the Corona Discharge A plasma device according to the invention is produced, in which the cathode is formed of a conductive cylinder of outside diameter 30 mm and inside diameter 10 mm, and in which the conductive anode is formed of a tungsten cylinder in which the diameter of the transverse cross-section is of the order of 1 mm. A continuous voltage is applied to the anode adapted to generate a corona discharge in the ambient air and at atmospheric pressure and the value of which varies only slightly for the different minimum radii of curvature studied. The maximum instantaneous current intensities generated by the corona discharge are given in Table 1 below. The length (mm) of the part of the plasma jet generated and projected by corona discharge in the ambient air that is visible to the eye in the absence of external stray light, in particular in darkness, is also measured.

TABLE 1

| Minimum radius of curvature, ρ (μm) | Maximum instantaneous current (mA) | Voltage applied to the anode (kV) | Length of the plasma jet (mm) |
|---|---|---|---|
| 10 | 14.2 | 8.1 | 10 |
| 20 | 20.8 | 8.1 | 10 |
| 50 | 25.5 | 8.3 | 10 |
| 100 | 42.5 | 8.3 | 10 |

An increase in the maximum instantaneous discharge current intensity is observed as the minimum radius of curvature increases. The measured length of the plasma jet does not vary substantially with the value of the minimum radius of curvature of the apical end of the anode. The inventors also observed that the width of the visible part of the plasma jet generated and projected by corona discharge in the ambient air increases as the value of the radius of curvature increases. The corona discharge producing the plasma jet is generated at the tip of the point with a natural repetition frequency of approximately 20 kHz.

EXAMPLE 5

Influence of the Value of the Inside Diameter ($\Phi_{ins}$) of the cathode on the voltage applied to the anode on the formation of corona discharge and on the length of the plasma jet obtained A plasma device according to the invention is produced, in which the cathode is formed of a conductive cylinder of outside diameter 30 mm, and in which the conductive anode is formed of a tungsten cylinder in which the diameter of the transverse cross-section is of the order of 1 mm and in which the minimum radius of curvature of the apical end is 10 μm. A continuous voltage is applied to the anode adapted to generate a corona discharge in the ambient air and at atmospheric pressure. The voltage values necessary to generate the corona discharge and the maximum instantaneous current intensities generated by said corona discharge are given in Table 2 below. The length (mm) of the part of the plasma jet generated and projected by corona discharge in the ambient air that is visible to the eye in the absence of external stray light, in particular in darkness, is also measured.

TABLE 2

| Inside diameter of the cathode, $\Phi_{ins}$ (mm) | Maximum instantaneous current (mA) | Voltage applied to the anode (kV) | Length of the plasma jet (mm) |
|---|---|---|---|
| 5 | 14.1 | 4.7 | 7 |
| 10 | 14.2 | 8.1 | 10 |
| 20 | 14.6 | 10.5 | 18 |

It is observed that the instantaneous current intensity does not vary with the value of the inside diameter ($\Phi_{ins}$) of the cathode, that the voltage to be applied to the anode in order to obtain the corona discharge increases with the distance separating the cathode and the apical part of the anode, and that the length (mm) of the part of the plasma jet generated and projected by corona discharge in the ambient air that is visible to the eye in the absence of external stray light, in particular in darkness, increases with said distance.

EXAMPLE 6

Bactericidal and/or Bacteriostatic Treatment

A bacterial culture of *Escherichia coli* is produced on the surface of a solid substrate, and the bacterial culture is subjected to a self-projected plasma jet according to the invention. The device for emitting the plasma jet is positioned several centimeters from the surface carrying the *E. coli* bacteria. After about 10 minutes' exposure of the contaminated surface to the self-projected plasma jet according to the invention, a reduction in the viable bacterial population of the order of 3 log is observed (the initial bacterial population is divided by 1000). This result is similar to that already obtained by other types of plasma reactor using in particular a post-discharge in flux generated by microwaves at reduced pressure.

The invention claimed is:

1. A device for emitting a plasma jet at ambient pressure and temperature, comprising:
- an anode assembly;
- a cathode assembly; and
- an electric field generator capable of emitting a plasma jet between the anode assembly and the cathode assembly, wherein:
  - the cathode assembly defines a dielectric space, called the inter-cathode space, extending inside a cathode surface of the cathode assembly, and the inter-cathode space comprises at least one cathode opening which opens to the outside of the inter-cathode space; and
  - the anode assembly comprises an anode extending inside the inter-cathode space, one portion of said anode, called the pointed portion, having a minimum radius of curvature, which extends as far as said at least one cathode opening so as to be capable of spontaneously emitting said plasma jet, the plasma jet being projected spontaneously according to a predetermined orientation towards the outside of the inter-cathode space.

2. The device as claimed in claim 1, wherein the at least one cathode opening is limited by an edge, called the active edge, of the cathode surface, said active edge extending in a plane, called the cathode opening plane, and disposed to extend tangentially to the pointed portion of the anode assembly.

3. The device as claimed in claim 2,
- wherein the anode assembly comprises at least one cylindrical anode generated by revolution about an axial direction,
- and wherein the pointed portion is a pointed axial end portion of said cylindrical anode, said pointed axial end portion having a cross-section, in at least one axial plane containing said axial direction, having a minimum radius of curvature, the value of said radius being adapted to permit the formation of discharges from said pointed axial end portion under the effect of an electric field formed by said electric field generator.

4. The device as claimed in claim 3, wherein the active edge of the cathode assembly has, in cross-section in at least one plane perpendicular to the cathode opening plane, said perpendicular plane comprising the pointed axial end portion of the cylindrical anode, a symmetrical form relative to said pointed axial end portion of the cylindrical anode with which the cathode assembly is associated.

5. The device as claimed in claim 4, wherein the cathode assembly has an active edge having, in cross-section in each plane perpendicular to said cathode opening plane, a form having symmetry relative to said pointed axial end portion of each cylindrical anode with which said cathode assembly is associated.

6. The device as claimed in claim 5, wherein the active edge of the cathode assembly has a circular form or a polygonal form with a center of symmetry.

7. The device as claimed in claim 3, wherein the cathode opening plane of the cathode assembly is substantially perpendicular to the axial direction of the cylindrical anode.

8. The device as claimed in claim 3, wherein each cylindrical anode has, in transverse cross-section perpendicular to its axial direction, a substantially discoid form, the diameter of which is from 0.5 mm to 3 mm.

9. The device as claimed in claim 2, wherein the active edge is an edge of a cathode of the cathode assembly, said edge surrounding the pointed axial end portion of the cylindrical anode of the anode assembly with which that cathode is associated.

10. The device as claimed in claim 9, wherein the active edge of the cathode has at least one plane of symmetry perpendicular to the cathode opening plane of said cathode, said cathode opening plane comprising the pointed axial end portion of each cylindrical anode with which the cathode(s) is associated, and adapted to spontaneously orient the plasma jet perpendicularly to the cathode opening plane.

11. The device as claimed in claim 1, wherein the electric field generator is capable of generating corona discharges.

12. The device as claimed in claim 1, wherein the cathode assembly comprises two cathode plates each having a straight active edge, said straight active edges of the two cathode plates being coplanar and mutually parallel and symmetrical relative to the mid-plane of the straight active edges of the two cathode plates, said mid-plane comprising the pointed portion of the anode assembly.

13. The device as claimed in claim 1, wherein the minimum radius of curvature of the pointed portion of the anode assembly is less than 500 μm.

14. The device as claimed in claim 1, wherein the pointed portion of the anode assembly comprises a conductive material selected from the group consisting of tungsten, tungsten carbides, aluminium, and their alloys.

15. The device as claimed in claim 1, wherein the active edge of the cathode assembly comprises at least one conductive material selected from the group consisting of brass, copper, and their alloys.

16. The device as claimed in claim 1, wherein the device is exempt of a gas generator for establishing a gas stream between the anode assembly and the cathode assembly.

17. A process for treating a surface, comprising:
- providing the device as claimed in claim 1;
- emitting the plasma jet; and
- disposing said surface in the plasma jet.

18. The process as claimed in claim 17, wherein the device is used for surface decontamination.

19. The process as claimed in claim 17 wherein the device is used for blood coagulation and asepsis.

20. A process for emitting a plasma jet at ambient pressure and temperature, said plasma being substantially free of excited ionic species and rich in radiative, metastable and/or radical excited neutral species, the method comprising:
- providing a device comprising:
  - an anode assembly;
  - a cathode assembly; and
  - an electric field generator capable of emitting a plasma jet between the anode assembly and the cathode assembly, wherein the cathode assembly defines a dielectric space, called the inter-cathode space extending inside a cathode surface of said the cathode assembly the inter-cathode space comprises at least one cathode opening which opens to the outside of the inter-cathode space, and the anode assembly comprises an anode extending inside the inter-cathode space, one portion, called the pointed portion, having a minimum radius of curvature, which extends as far as said at least one cathode opening so as to be capable of causing an emission of a plasma jet which is projected spontaneously according to a predetermined orientation towards the outside of the inter-cathode space; and delivering by the electric field generator a voltage of from 0.5 V to 20 kV between the anode assembly and the cathode assembly so as to cause an emission of a plasma jet, which is projected spontaneously according to a predetermined orientation towards the outside of the inter-cathode space.

21. The method as claimed in claim 20, wherein no gas generator is used for establishing a gas stream between the anode assembly and the cathode assembly.

* * * * *